(12) United States Patent
Lin et al.

(10) Patent No.: US 10,868,447 B2
(45) Date of Patent: Dec. 15, 2020

(54) FAST METHOD FOR IDENTIFYING COIL MISALIGNMENT/MUTUALCOUPLING IN WIRELESS CHARGING SYSTEMS

(71) Applicant: THE UNIVERSITY OF HONG KONG, Hong Kong (CN)

(72) Inventors: Deyan Lin, Kowloon (HK); Shu Yuen Ron Hui, New Territories (HK)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 348 days.

(21) Appl. No.: 15/578,607

(22) PCT Filed: Jun. 1, 2015

(86) PCT No.: PCT/CN2015/080462
§ 371 (c)(1),
(2) Date: Nov. 30, 2017

(87) PCT Pub. No.: WO2016/191999
PCT Pub. Date: Dec. 8, 2016

(65) Prior Publication Data
US 2018/0159382 A1  Jun. 7, 2018

(51) Int. Cl.
*H02J 50/90* (2016.01)
*H04B 5/00* (2006.01)
(Continued)

(52) U.S. Cl.
CPC .............. *H02J 50/90* (2016.02); *H02J 50/12* (2016.02); *H02J 50/50* (2016.02); *H04B 5/0031* (2013.01);
(Continued)

(58) Field of Classification Search
CPC ....................................................... H02J 50/90
(Continued)

(56) References Cited

U.S. PATENT DOCUMENTS

2010/0045114 A1   2/2010 Sample et al.
2010/0081379 A1*  4/2010 Cooper .................. H01Q 1/248
                                                      455/41.1
(Continued)

FOREIGN PATENT DOCUMENTS

CN          104319909 A       1/2015
WO     WO 2015018334 A1       2/2015

OTHER PUBLICATIONS

International Preliminary Report on Patentability in corresponding PCT Application No. PCT/CN2015/080462, dated Mar. 2, 2016.
(Continued)

*Primary Examiner* — Jerry D Robbins
(74) *Attorney, Agent, or Firm* — Leason Ellis LLP

(57) ABSTRACT

Methods and apparatus for determining the misalignment and mutual coupling between the transmitter coil and receiver coil, with or without an intermediate relay resonator coil, of a wireless power charging system are provided. The determination can be made without using any direct measurement from the receiver circuit. The technic involves exciting the transmitter coil of the wireless power charging system at several frequencies with equal or different input voltage/current, such that the number of equivalent circuit equations is at least equal to the number of unknown terms in the equations. The methods use the knowledge of only the input voltage and the input current of the transmitter coil. This means that the mutual inductance or magnetic coupling coefficient between the transmitter and receiver coils can be determined based on the information obtained from the transmitter circuit and there is no need for any wireless communication from or direct measurements of the receiver circuit.

21 Claims, 6 Drawing Sheets

(51) Int. Cl.
*H02J 50/50* (2016.01)
*H02J 50/12* (2016.01)
*H02J 7/02* (2016.01)

(52) U.S. Cl.
CPC ............ *H04B 5/0037* (2013.01); *H02J 7/025* (2013.01); *H04B 5/0081* (2013.01)

(58) Field of Classification Search
USPC ........................................................ 320/108
See application file for complete search history.

(56) References Cited

U.S. PATENT DOCUMENTS

2010/0187913 A1* 7/2010 Smith .................... H02J 5/005 307/104
2013/0310630 A1* 11/2013 Smith .................... A61M 1/127 600/16
2014/0378743 A1* 12/2014 Smith .................... A61M 1/127 600/16

OTHER PUBLICATIONS

Onar et al., "Oak Ridge National Laboratory Wireless Power Transfer Development for Sustainable Campus Initiative", IEEE Transportation Electrification Conference and Expo (ITEC), 2013, pp. 1- 8.

N. Y. Kim et al., "Adaptive frequency with power-level tracking system for efficient magnetic resonance wireless power transfer", Electron. Lett., 12 Apr. 2012, vol. 48, No. 8, pp. 452-454.

W. X. Zhong et al., "A Methodology for Making a Three-Coil Wireless Power Transfer System More Energy Efficient Than a Two-Coil Counterpart for Extended Transfer Distance", IEEE Transactions on Power Electronics, Feb. 2015, vol. 30, No. 2, pp. 933-942.

J. G. Hayes et al., "Wide-load-range resonant converter supplying the SAE J-1773 electric vehicle inductive charging interface", IEEE Transactions on Industry Applications, Jul./Aug. 1999, vol. 35, pp. 884-895.

W. Chwei-Sen et al., "Design considerations for a contactless electric vehicle battery charger", IEEE Transactions on Industrial Electronics, Oct. 2005, vol. 52, No. 5, pp. 1308-1314.

U. K. Madawala et al., "A Bidirectional Inductive Power Interface for Electric Vehicles in V2G Systems", IEEE Transactions on Industrial Electronics, Oct. 2011, vol. 58, No. 10, pp. 4789-4796.

J. Yin et al., "A Systematic Approach for Load Monitoring and Power Control in Wireless Power Transfer Systems Without Any Direct Output Measurement", IEEE Transactions on Power Electronics, Mar. 2015, vol. 30, No. 3, pp. 1657-1667.

W. Zhong and S. Hui, "Maximum Energy Efficiency Tracking for Wireless Power Transfer Systems", IEEE Transactions on Power Electronics, Jul. 2015, vol. 30, No. 7, pp. 4025-34.

Fotopoulou, K.; Flynn, B.W., "Wireless Power Transfer in Loosely Coupled Links: Coil Misalignment Model," IEEE Transactions on Magnetics, Feb. 2011, Volume: 47, No. 2, pp. 416-430.

Amos, A.O., Ykandar, H.; Yasser, A.; Karim, D, "Computation of the mutual inductance between circular filaments with coil misalignment," AFRICON, Sep. 2013, pp. 1 -5.

* cited by examiner

FAST METHOD FOR IDENTIFYING COIL MISALIGNMENT/MUTUALCOUPLING IN WIRELESS CHARGING SYSTEMS

CROSS-REFERENCE TO RELATED PATENT APPLICATIONS

This application is a U.S. National Phase Application under 35 U.S.C. § 371 of International Patent Application No. PCT/CN2015/080462, filed Jun. 1, 2015, which is incorporated by reference in their entirety. The International Application was published on Dec. 8, 2016 as International Publication No. WO 2016/191999 A1 under PCT Article 21(2).

FIELD OF THE INVENTION

The present invention relates generally to a fast method for identifying coil misalignment and mutual coupling of transmitter and receiver coils in wireless charging systems without using direct measurement from the receiver coil.

BACKGROUND OF THE INVENTION

While wireless power was pioneered by Nicola Tesla a century ago, it has gained substantial attention for commercial applications only in the last two decades. One reason for this is the emerging availability of power electronics, which provide a technical means to process electrical power at high speed with high frequency switching, thus acting as an enabling technology for wireless power transfer. Generally, a wireless power transfer system consists of at least a transmitter module (comprising a transmitter circuit and a transmitter coil) and at least one receiver module (comprising a receiver coil and a receiver circuit). Tesla pointed out in his research that using magnetic coupling with resonance could achieve optimal efficiency. This magnetic resonance concept, originated by Tesla, has been adopted by Prof. John Boys in his inductive power transfer research for mobile robotics (since 1990's) and by Prof. Ron Hui in his planar wireless charging platforms for portable electronic products (since 2000's). The world's first wireless power standard "Qi", launched by the Wireless Power Consortium, has incorporated the near-field magnetic coupling and resonant circuits into the basic technology for wireless charging of a range of products.

In recent research, one major topic is related to the misalignment between the transmitter coil and the receiver coil. This issue is particularly relevant to wireless charging of electric vehicles, although it must be emphasized that this issue is relevant to many other wireless charging applications. For portable electronics devices, such as mobile phones, the Qi standard adopts the multilayer coil array structures proposed by Prof. Ron Hui so that the targeted devices (with their received coils embedded) can be placed anywhere on the charging surface. Such a feature is called "free-positioning." But for electric vehicles, the transmitter coil is usually laid under the floor, while the receiver coil is located inside the vehicle. Since it is not easy to park the vehicle in the exact location each time, the misalignment between the transmitter and receiver coils has become a challenging issue. A driver can hardly align the two coils visually when one of them is under ground. Some cases alignment is also limited by the parking position.

Some researchers have proposed the use of a wireless communication system to provide feedback information from the receiver circuit to the transmitter circuit in order to optimize the alignment, and hence the control. Such a solution is reported in Onar et al., "Oak Ridge National Laboratory Wireless Power Transfer Development for Sustainable Campus Initiative", 2013 *IEEE Transportation Electrification Conference and Expo* (ITEC), 2013, pp. 1-8 and N. Y. Kim et al., "Adaptive frequency with power-level tracking system for efficient magnetic resonance wireless power transfer", *Electron. Lett.*, Vol. 48, No. 8, pp. 452-454, 12 April 2012. However, the additional wireless communication module increases the cost and the overall complexity of the system.

The present inventors have previously pioneered a technique that can monitor the output conditions of the receiver circuit without using any wireless or wired communication circuit for feeding the output information back to the controller on the transmitter side. This technique is disclosed in S. Y. R. Hui, D. Lin, J. Yin and C. K. Lee, "Methods for Parameter Identification, Load Monitoring and Output Power Control in Wireless Power Transfer Systems", U.S. Provisional Patent Application 61/862,627 filed Aug. 6, 2013 (the "'627 application"); and PCT patent application PCT/CN2014/083775 filed Aug. 6, 2014 ("Hui '775 PCT application"), which applications are incorporated herein by reference in their entirety. In the Hui '775 PCT application there is proposed a methodology for (1) identifying the system parameters, (2) monitoring the load conditions and (3) generating output control based on the use of the input voltage and input current in the transmitter circuit. The methodology of the Hui '775 PCT application does not use any direct measurement of the receiver circuit or the load on the receiver side. This technology involves 2 main processes. The first process uses an intelligent or evolutionary algorithm, such as a genetic algorithm or swarm particle algorithm or their variants, to determine the system parameters. After this first process has been completed and the parameters have been identified, a system model can be developed. In the second process, the system matrix equations with the known system parameters obtained from the first process (except the load impedance) can be re-arranged and used to calculate the load impedance with one measurement of the input voltage and input current. As a result, all of the required information, such as load power, output voltage and output power of the receiver circuit, etc., can be calculated. A block diagram of the concept is shown in FIG. 1. In this previous patent application, the first process usually takes a fairly long time (in terms of tens of minutes if a fast processor is used) to determine the system parameters including the mutual inductance terms among the coupled windings.

It would be advantageous if the method of the Hui '775 PCT application could be improved so that the calculation time could be significantly shortened.

SUMMARY OF THE INVENTION

The present invention relates to a method and apparatus to calculate coil misalignment in wireless charging, in which the time taken to calculate the necessary system parameters (i.e. mutual inductance between coils) is greatly reduced, e.g., to less than a minute and, more particularly, relates to rapid calculation for coil misalignment in wireless charging of electric vehicles.

The proposed method can be implemented in the same circuit structure as shown in FIG. 1; but, the use of intelligent or evolutionary algorithms in the first process of system parameter identification can be eliminated. Unlike the use of evolutionary algorithms, which typically require tens of minutes to determine the system parameters, this proposed method can determine the mutual inductance terms within a very short time (in terms of seconds rather than tens of minutes).

In this invention, the method of identifying the system parameters for electrical vehicle wireless charging is proposed. Since the uncertainties of the (1) coil misalignment and (2) coil distance are related to the mutual inductance values of the mutual coupled coils only and are independent of the capacitance in the coil resonators, this invention focuses on a method of estimating these mutual inductance terms in a rapid manner. The assumption is that the self-inductance terms and the resonant-capacitance terms are known from the manufacturers. Only the mutual inductance terms and the load impedance terms are unknown.

For parking (EV charging application), since only the mutual inductance will be changed, the proposed new method can generate sufficient number of equations to solve the unknown system parameters very quickly (in seconds).

The current invention performs the following steps to obtain the parameters at the transmitter side for providing the best efficiency to the receiver coil:

(1) Excite the power system at a number of different frequencies to take more measurements for a sufficient number of equations in order to solve for the unknown values.

(2) Solve the system matrix equation using the generated equations for the unknown system parameter (i.e. mutual inductance value).

When the number of equations is equal to or more than the number of unknown parameters, the equations can be solved mathematically for the unknown parameters. If constant power is required for electric vehicles (EV), the wireless power transfer (WPT) system can use different voltage magnitudes instead of different excitation frequencies to generate the required number of equations. Once the system parameters are identified, the WPT system can choose the proper operating frequency and input voltage/current to operate at its best efficiency using the same method disclosed in the Hui '775 PCT application.

BRIEF DESCRIPTION OF THE DRAWINGS

The present invention can be more fully understood by the following detailed description of the preferred embodiments, with reference made to the accompanying drawings, wherein.

DETAILED DESCRIPTION OF EXEMPLARY EMBODIMENTS OF THE INVENTION

Figure 1:
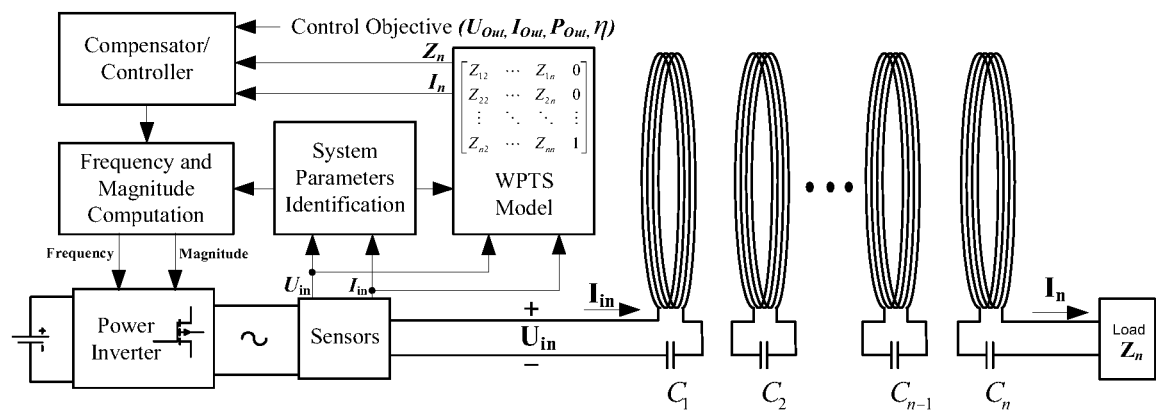
FIG. 1 is a block diagram of a wireless power transfer system with unknown system parameters which does not use feedback from the receiver for control purposes.
Figure 2:
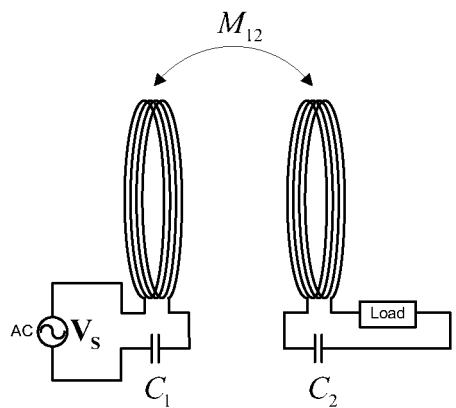
FIG. 2 is a block diagram of a prior art 2-coil wireless power transfer system.
Figure 3:
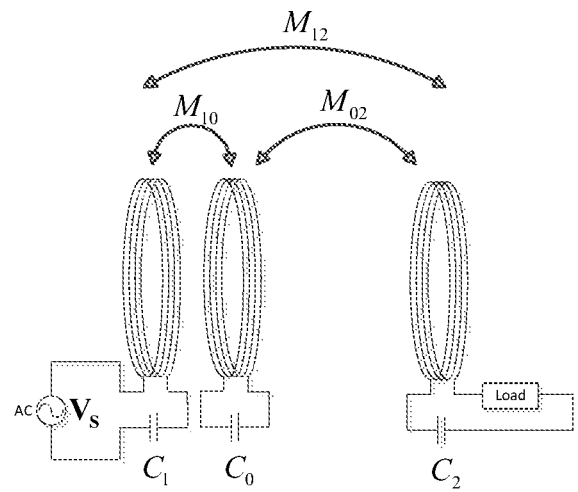
FIG. 3 is a block diagram of a prior art 3-coil wireless power transfer system.

The proposed method of the present invention may be explained with the use of a 2-coil wireless power transfer system as shown in FIG. 2 and a 3-coil system which has a relay resonator between the transmitter coil and the receiver coil as shown in FIG. 3. The advantage of using a 3-coil system can be found in reference: W. X. Zhong et al., "A Methodology for Making a Three-Coil Wireless Power Transfer System More Energy Efficient Than a Two-Coil Counterpart for Extended Transfer Distance", *IEEE Transactions on Power Electronics*, vol. 30, pp. 933-942, 2015 (the "Zhong 2015 article 1").

The descriptions given below are based on wireless charging of electric vehicles (EV). However, it should be noted that the proposed method is also applicable to other wireless charging systems.

Figure 4:
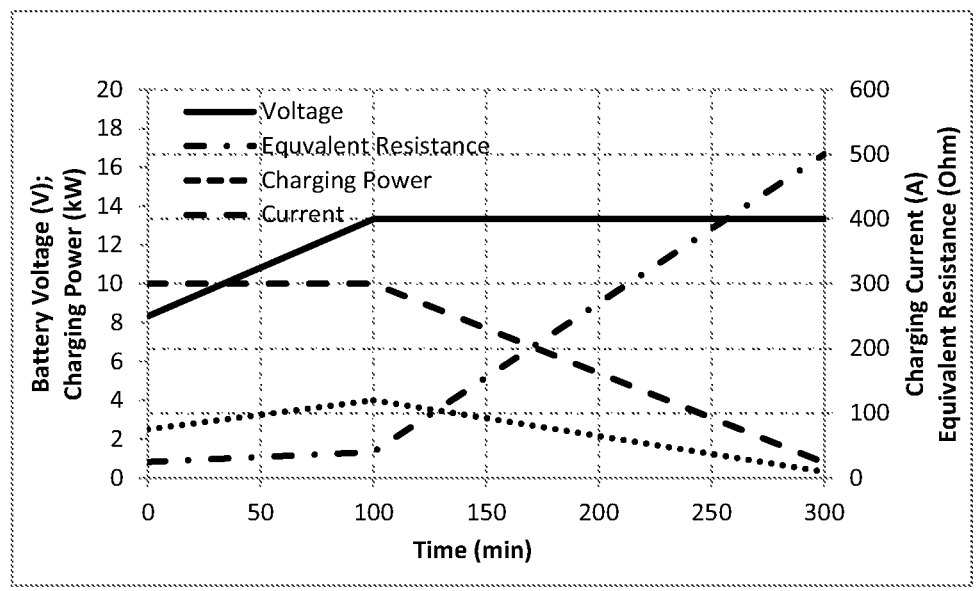
FIG. 4 is a graph of a typical battery charging profiles.

There are numerous publications on wireless charging of electric vehicles. Examples are: J. G. Hayes et al., "Wide-load-range resonant converter supplying the SAE J-1773 electric vehicle inductive charging interface", *Industry Applications, IEEE Transactions on*, vol. 35, pp. 884-895, 1999; W. Chwei-Sen et al., "Design considerations for a contactless electric vehicle battery charger", *Industrial Electronics, IEEE Transactions on*, vol. 52, pp. 1308-1314, 2005; and U. K. Madawala et al., "A Bidirectional Inductive Power Interface for Electric Vehicles in V2G Systems", *Industrial Electronics, IEEE Transactions on*, vol. 58, pp. 4789-4796, 2011. In these reports, all the parameters of the transmitter and the receivers must be known. Such parameters include the self-inductances and the resistances of the transmitter coil(s) and the receiver coil, the mutual inductances between all mutually coupled coils, the capacitances connected in the transmitter circuit and the receiver circuit, and the equivalent load impedance. Based on these parameters, one can use circuit theory to calculate power, efficiency of the system, and can decide upon the charging strategy according to the type of the battery and the condition of the battery. For EV battery charging, the charging process usually consists of two main stages: namely (i) a constant-current (CC) charging stage and (ii) a constant-voltage (CV) charging stage. FIG. 4 shows in the top graph at 100 minutes the constant voltage charge rate over time. The next lower graph at 100 minutes is the constant current charge rate over time. The equivalent charging power is indicated in the next lower graph and the bottom graph is the equivalent resistance.

For an electric vehicle (EV) charging system, the first thing for an EV wireless charger to determine is the state of charge (SOC) of the battery so as to choose either CC mode or CV mode to charge the battery properly. To ensure that the battery is charged in the right mode at all times, it is assumed that the wireless charging system has a charging controller at the receiver side which can convert the received ac power into dc power, and can also charge the battery according to the battery charging profile. The controller is able to automatically adjust its input impedance to absorb the correct power from the receiver and deliver the charge to the battery.

With the help of the charging controller at the receiver side, what the wireless charging system needs to do is to predict the power needed from the battery and change its operating conditions (e.g. adjust its operating frequency and input voltage/input current in the transmitter circuit so that the wireless power is transferred to the load (such as the battery) in the most efficient and optimal manner. This is described in the article, J. Yin et al., "A Systematic Approach for Load Monitoring and Power Control in Wireless Power Transfer Systems Without Any Direct Output Measurement", *IEEE Transactions on Power Electronics*, vol. 30, pp. 1657-1667, 2015 (the "Yin 2015 article"), which is incorporated herein in its entirety.

To ensure the wireless charging system always operates in the optimal mode, all of the parameters of the whole system need to be known. The most difficult parameters are the mutual inductance(s) related to (1) coil misalignment and (2) the distances between the transmitting coil(s) and the receiver coil(s). This is particularly true for wireless EV charging, because it is not easy to park a vehicle in the exact location each time. There must be some tolerance for misalignment between the transmitter coil and the receiver coil. In addition, the distance between the transmitter coil and the receiver coil may also vary from one type of vehicle to another type. A 4-wheel-drive vehicle will probably have a large distance between the transmitter coil and the receiver coil, while a compact car may have a smaller distance.

Since the uncertainties of the (1) coil misalignment and (2) coil distance are related to the mutual inductance values of the mutually coupled coils only, and are independent of the capacitance in the coil resonators, the present invention focuses on a method of estimating these mutual inductance terms in a rapid manner. The assumption is that the self-inductance terms and the resonant-capacitance terms are known (obtained either from the method of the Hui '775 PCT application or from the manufacturers). Once determined for a particular setup, they need not be determined again. Only the mutual inductance terms and the load impedance terms are unknown and must be determined.

The determination of the mutual inductance terms is based on information (such as input voltage, input current and the phase angle between the input voltage and current waveforms) obtained only on the transmitter circuit without using any direct measurement on the receiver circuit. This important feature eliminates the need for a wireless communication system between the transmitter and receiver circuits. For the application of EV charging, there is no need to know the exact positions of or relative positions between the transmitter coil and the receiver coil, because such information is represented in the electrical circuit model in terms of the mutual inductance.

The present invention proposes a method of identifying the system parameters for EV wireless charging, but the principles can be applied to any wireless power transfer system with 2 or more mutually coupled coils. Examples are the 2-coil EV wireless charging system in FIG. 5 and the 3-coil system shown in FIG. 6. In both drawings the ac source is shown generating the voltage Vs which is applied to input coil A, which has a resonance capacitance $C_1$. The field of coil A is coupled to output coil B, which has resonance capacitance $C_2$. The ac voltage from coil B is converted into dc voltage in converter 50, the dc from converter 50 is converted into a different dc voltage in converter 52, whose output is applied to the load. Thus, in FIG. 5 there is mutual coupling $M_{12}$ between coils A and B.

Figure 5:
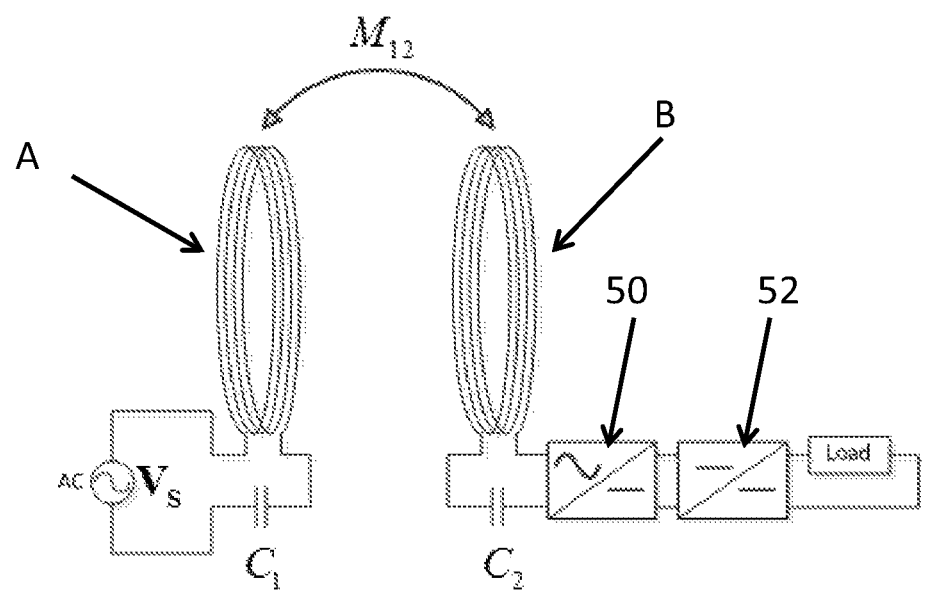
FIG. 5 is block diagram of a 2-coil EV wireless charging system with ac/dc and dc/dc converters according to the present invention.
Figure 6:
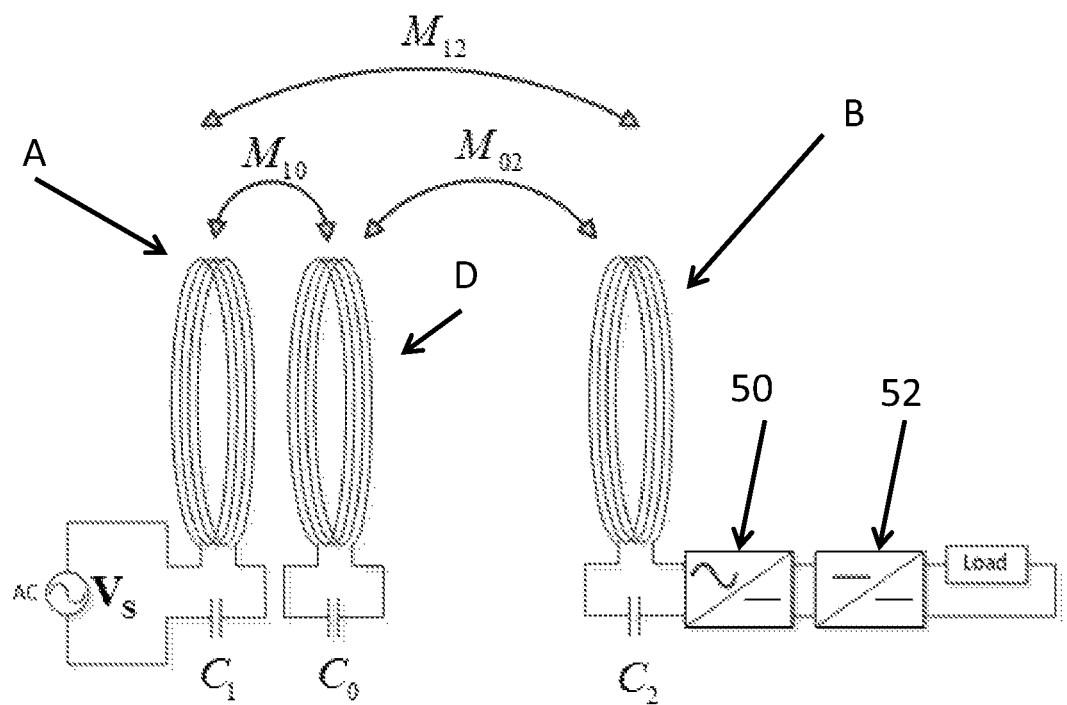
FIG. 6 is a block diagram of a 3-coil EV wireless charging system with ac/dc and dc/dc converters according to the present invention.

In the 3-coil system of FIG. 6, there is an additional relay coil-resonator D with a resonance capacitance $C_0$, but it is otherwise similar to the system of FIG. 5. Because of the relay coil there are additional mutual couplings $M_{10}$ and $M_{02}$.

Figure 7:
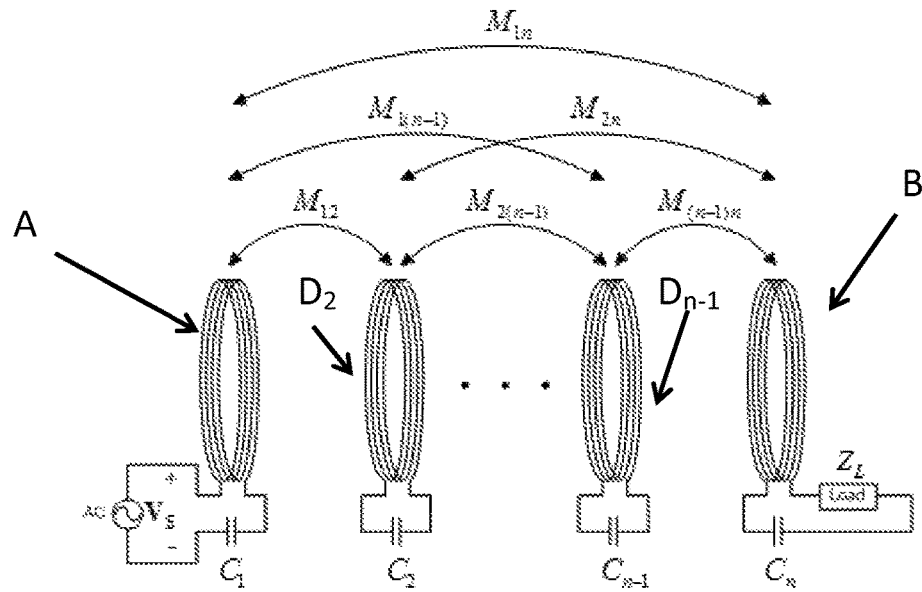
FIG. 7 is a block diagram of an n-coil wireless power transfer system according to the present invention.

A more generalized analysis of the system can be explained with the assistance of FIG. 7 which shows a wireless power transfer system consisting of n coils, where the $1^{st}$ coil A is the transmitter, the $n^{th}$ coil B is the receiver. The relay coils are $D_2$ up to $D_{n-1}$. If $L_i$ is the self-inductance, $R_i$ is the coil resistance and $C_i$ is the resonant capacitance of the $i^{th}$ coil respectively; $M_{ij}$ is the mutual-inductance between the $i^{th}$ coil and the $j^{th}$ coil (obviously $M_{ij}=M_{ji}$), and $Z_L$ is the load impedance, then the system could be described in a general matrix equation (1).

$$\begin{bmatrix} V_s(\omega) \\ 0 \\ \vdots \\ 0 \\ 0 \end{bmatrix} = \qquad (1)$$

$$\begin{bmatrix} Z_1(\omega) & j\omega M_{12} & \cdots & j\omega M_{1(n-1)} & j\omega M_{1n} \\ j\omega M_{12} & Z_2(\omega) & \cdots & j\omega M_{2(n-1)} & j\omega M_{2n} \\ \vdots & \vdots & \ddots & \vdots & \vdots \\ j\omega M_{1(n-1)} & j\omega M_{2(n-1)} & \cdots & Z_{n-1}(\omega) & j\omega M_{(n-1)n} \\ j\omega M_{1n} & j\omega M_{2n} & \cdots & j\omega M_{(n-1)n} & Z_n(\omega) + Z_L(\omega) \end{bmatrix} \begin{bmatrix} I_1(\omega) \\ I_2(\omega) \\ \vdots \\ I_{n-1}(\omega) \\ I_n(\omega) \end{bmatrix}$$

where $$Z_i(\omega) = R_i + j\left(\omega L_i - \frac{1}{\omega C_i}\right)$$

is the total impedance of the $i^{th}$ coil, $V_S(\omega)$ is the input voltage vector in the first coil, $I_i(\omega)$ is the current vector of the $i^{th}$ coil, and $\omega$ is the angular frequency of $V_S(\omega)$.

In the previous invention disclosed in the Hui '775 PCT application, which is incorporated herein in its entity, the present inventors demonstrated the use of a 2-stage process to (i) obtain the system parameters including the mutual inductance terms based on information obtained from the transmitter circuit and (ii) take a measurement of the input voltage and input current, calculate the load impedance and control the output voltage and output power in the receiver circuit. This technique makes use of a search algorithm, such as the genetic algorithm or the particle swarm algorithm, in stage (i). However, solving those algorithms requires typically tens of minutes to obtain the results. The advantage of this previous invention is that once the self-inductance terms and resonant-capacitance terms are determined, these values of a particular system (such as an EV) remain the same. The only terms that may change each time are the mutual inductance terms, which depend on the vehicle parking location with respect to the charging coils.

The present invention maintains the same concept of using information only on the transmitter circuit. However, the present invention proposes the use of a much faster method to obtain the mutual inductance terms. In general, it is necessary to have the number of equations matching or larger than the number of unknowns in order to solve the equations for all the unknowns analytically. Sometimes there is no analytical solution or redundant equations need to be used to reduce the effect of measurement errors. Search algorithms are usually used to estimate the unknowns under such situation. With the present invention, the wireless power system is excited at a number of different frequencies (or alternatively different input voltage levels in some cases) in order to obtain a sufficient number of equations to meet the number of unknowns. In this way, all of the unknowns can be solved analytically or numerically, without using any time-consuming search algorithms such as genetic algorithms or particle swarm algorithms. Therefore, this new approach is a much faster method than using search algorithms.

Now consider the system matrix equation (1). It is assumed that only the input voltage $V_S(\omega)$ and input current $I_1(\omega)$ can be measured and used in the parameter identification process. If it is assumed that all of the self-inductance terms and the capacitance terms are known (obtained either from the method of the inventors' previous invention or from the manufacturers), then $z_i(\omega)$ is known when the frequency is known.

The unknowns in equation (1) are: $M_{ij}$ (i, j=1, 2, . . . n; i≠j), $I_2(\omega) \sim I_n(\omega)$, and $Z_L(\omega)$. For an EV wireless charger the load can be treated as a constant pure resistive load or a pure resistive load which absorbs constant power during short periods of time, thus $Z_L(\omega)$ could be $R_L$. Hence, there are totally $$\binom{n}{2} + (n-1) + 1 = \frac{n(n+1)}{2}$$

unknowns when one measurement is taken for $V_S(\omega)$ and $I_1(\omega)$, where $$\binom{n}{2}$$

is the 2-combinations among n coils.

Obviously, for the 1$^{st}$ measurement, there are $$\frac{n(n+1)}{2}$$

unknowns, but only n equations in matrix equation (1). Because there are more unknowns than equations, it is not possible to calculate all the unknowns. Nevertheless, if more measurements are taken at different frequencies $\omega_i$, for each more measurement, there are n more equations, but (n−1) more unknowns ($I_2(\omega_i) \sim I_n(\omega_i)$). Therefore, there will be enough equations to solve the mathematical problem analytically when $$m = \frac{n(n+1)}{2} - n + 1 = \frac{n^2 - n + 2}{2}$$

times measurements are taken at different frequencies as shown in matrix equation (2).

$$\left\{ \begin{aligned} \begin{bmatrix} V_s(\omega_1) \\ 0 \\ \vdots \\ 0 \\ 0 \end{bmatrix} &= \begin{bmatrix} Z_1(\omega_1) & j\omega_1 M_{12} & \cdots & j\omega_1 M_{1(n-1)} & j\omega_1 M_{1n} \\ j\omega_1 M_{12} & Z_2(\omega_1) & \cdots & j\omega_1 M_{2(n-1)} & j\omega_1 M_{2n} \\ \vdots & \vdots & \ddots & \vdots & \vdots \\ j\omega_1 M_{1(n-1)} & j\omega_1 M_{2(n-1)} & \cdots & Z_{n-1}(\omega_1) & j\omega_1 M_{(n-1)n} \\ j\omega_1 M_{1n} & j\omega_1 M_{2n} & \cdots & j\omega_1 M_{(n-1)n} & Z_n(\omega_1) + R_L \end{bmatrix} \begin{bmatrix} I_1(\omega_1) \\ I_2(\omega_1) \\ \vdots \\ I_{n-1}(\omega_1) \\ I_n(\omega_1) \end{bmatrix} \\ \begin{bmatrix} V_s(\omega_2) \\ 0 \\ \vdots \\ 0 \\ 0 \end{bmatrix} &= \begin{bmatrix} Z_1(\omega_2) & j\omega_2 M_{12} & \cdots & j\omega_2 M_{1(n-1)} & j\omega_2 M_{1n} \\ j\omega_2 M_{12} & Z_2(\omega_2) & \cdots & j\omega_2 M_{2(n-1)} & j\omega_2 M_{2n} \\ \vdots & \vdots & \ddots & \vdots & \vdots \\ j\omega_2 M_{1(n-1)} & j\omega_2 M_{2(n-1)} & \cdots & Z_{n-1}(\omega_2) & j\omega_2 M_{(n-1)n} \\ j\omega_2 M_{1n} & j\omega_2 M_{2n} & \cdots & j\omega_2 M_{(n-1)n} & Z_n(\omega_2) + R_L \end{bmatrix} \begin{bmatrix} I_1(\omega_2) \\ I_2(\omega_2) \\ \vdots \\ I_{n-1}(\omega_2) \\ I_n(\omega_2) \end{bmatrix} \\ &\vdots \\ \begin{bmatrix} V_s(\omega_m) \\ 0 \\ \vdots \\ 0 \\ 0 \end{bmatrix} &= \begin{bmatrix} Z_1(\omega_m) & j\omega_m M_{12} & \cdots & j\omega_m M_{1(n-1)} & j\omega_m M_{1n} \\ j\omega_m M_{12} & Z_2(\omega_m) & \cdots & j\omega_m M_{2(n-1)} & j\omega_m M_{2n} \\ \vdots & \vdots & \ddots & \vdots & \vdots \\ j\omega_m M_{1(n-1)} & j\omega_m M_{2(n-1)} & \cdots & Z_{n-1}(\omega_m) & j\omega_m M_{(n-1)n} \\ j\omega_m M_{1n} & j\omega_m M_{2n} & \cdots & j\omega_m M_{(n-1)n} & Z_n(\omega_m) + R_L \end{bmatrix} \begin{bmatrix} I_1(\omega_m) \\ I_2(\omega_m) \\ \vdots \\ I_{n-1}(\omega_m) \\ I_n(\omega_m) \end{bmatrix} \end{aligned} \right. \quad (2)$$

When there are only 2 coils, 1 transmitter and 1 receiver, in the EV wireless charging system with one transmitter coil and one receiver coil (FIG. 5), the matrix equations (1) and (2) can be modified to matrix equation (3) and (4).

$$\begin{bmatrix} V_s(\omega) \\ 0 \end{bmatrix} = \begin{bmatrix} Z_1(\omega) & j\omega M_{12} \\ j\omega M_{12} & Z_2(\omega) + R_L \end{bmatrix} \begin{bmatrix} I_1(\omega) \\ I_2(\omega) \end{bmatrix} \quad (3)$$

$$\left\{ \begin{aligned} \begin{bmatrix} V_s(\omega_1) \\ 0 \end{bmatrix} &= \begin{bmatrix} Z_1(\omega_1) & j\omega_1 M_{12} \\ j\omega_1 M_{12} & Z_2(\omega_1) + R_L \end{bmatrix} \begin{bmatrix} I_1(\omega_1) \\ I_2(\omega_1) \end{bmatrix} \\ \begin{bmatrix} V_s(\omega_2) \\ 0 \end{bmatrix} &= \begin{bmatrix} Z_1(\omega_2) & j\omega_2 M_{12} \\ j\omega_2 M_{12} & Z_2(\omega_2) + R_L \end{bmatrix} \begin{bmatrix} I_1(\omega_2) \\ I_2(\omega_2) \end{bmatrix} \end{aligned} \right. \quad (4)$$

In equation (4), when the input voltage $V_S(\omega_1)$, $V_S(\omega_2)$ and the input current $I_1(\omega_1)$, $I_1(\omega_2)$ are measured at two angular frequencies (i.e. $\omega_1$ and $\omega_2$), there are 4 unknowns: $M_{12}$, $R_L$, $I_2(\omega_1)$ and $I_2(\omega_2)$, and the solutions for $M_{12}$ and $R_L$ can be determined easily.

When there are 3 coils in the EV wireless charging system including a transmitter coil A, a relay resonator coil D and a receiver coil B (FIG. 6), n=3, $$m = \frac{n^2 - n + 2}{2} = 4,$$

the matrix equations (1) and (2) can be modified to matrix equation (5) and (6).

$$\begin{bmatrix} V_s(\omega) \\ 0 \\ 0 \end{bmatrix} = \begin{bmatrix} Z_1(\omega) & j\omega M_{10} & j\omega M_{12} \\ j\omega M_{10} & Z_0(\omega) & j\omega M_{02} \\ j\omega M_{12} & j\omega M_{02} & Z_2(\omega) + R_L \end{bmatrix} \begin{bmatrix} I_1(\omega) \\ I_0(\omega) \\ I_2(\omega) \end{bmatrix} \quad (5)$$

$$\left\{ \begin{bmatrix} V_s(\omega_1) \\ 0 \\ 0 \end{bmatrix} = \begin{bmatrix} Z_1(\omega_1) & j\omega_1 M_{10} & j\omega_1 M_{12} \\ j\omega_1 M_{10} & Z_0(\omega_1) & j\omega_1 M_{02} \\ j\omega_1 M_{12} & j\omega_1 M_{02} & Z_2(\omega_1) + R_L \end{bmatrix} \begin{bmatrix} I_1(\omega_1) \\ I_0(\omega_1) \\ I_2(\omega_1) \end{bmatrix} \right. \quad (6)$$

$$\begin{bmatrix} V_s(\omega_2) \\ 0 \\ 0 \end{bmatrix} = \begin{bmatrix} Z_1(\omega_2) & j\omega_2 M_{10} & j\omega_2 M_{12} \\ j\omega_2 M_{10} & Z_0(\omega_2) & j\omega_2 M_{02} \\ j\omega_2 M_{12} & j\omega_2 M_{02} & Z_2(\omega_2) + R_L \end{bmatrix} \begin{bmatrix} I_1(\omega_2) \\ I_0(\omega_2) \\ I_2(\omega_2) \end{bmatrix}$$

$$\begin{bmatrix} V_s(\omega_3) \\ 0 \\ 0 \end{bmatrix} = \begin{bmatrix} Z_1(\omega_3) & j\omega_3 M_{10} & j\omega_3 M_{12} \\ j\omega_3 M_{10} & Z_0(\omega_3) & j\omega_3 M_{02} \\ j\omega_3 M_{12} & j\omega_3 M_{02} & Z_2(\omega_3) + R_L \end{bmatrix} \begin{bmatrix} I_1(\omega_3) \\ I_0(\omega_3) \\ I_2(\omega_3) \end{bmatrix}$$

$$\left. \begin{bmatrix} V_s(\omega_4) \\ 0 \\ 0 \end{bmatrix} = \begin{bmatrix} Z_1(\omega_4) & j\omega_4 M_{10} & j\omega_4 M_{12} \\ j\omega_4 M_{10} & Z_0(\omega_4) & j\omega_4 M_{02} \\ j\omega_4 M_{12} & j\omega_4 M_{02} & Z_2(\omega_4) + R_L \end{bmatrix} \begin{bmatrix} I_1(\omega_4) \\ I_0(\omega_4) \\ I_2(\omega_4) \end{bmatrix} \right\}$$

In equation (6), when the input voltage $V_S(\omega_1)$ through $V_S(\omega_4)$ and input current $I_1(\omega_1)$ through $I_1(\omega_4)$ are measured at 4 different angular frequencies (i.e. $\omega_1$ to $\omega_4$), the result is 12 equations as shown above. At the same time, there are 12 unknowns: $M_{10}$, $M_{02}$, $M_{12}$, $R_L$, $I_0(\omega_1)$ to $I_0(\omega_4)$, $I_2(\omega_1)$ to $I_2(\omega_4)$, so the solutions for $M_{10}$, $M_{02}$, $M_{12}$ and $R_L$ are obtained analytically.

When the ac/dc and dc/dc converters 50, 52 are included in the receiver circuit (e.g. for a wireless charging system) as shown in FIG. 5 and FIG. 6, a simple way to describe the EV charger system's behavior is to treat the battery as a constant power load during short periods of time. In that case the constant resistive load $R_L$ must be changed into a constant power load $P_L$ in equation (4) and equation (6), where $$R_L = \frac{P_L}{|I_L|^2}, |I_L|$$

is the absolute value of load current ($|I_L|=|I_2|$). The result is equation (7) and equation (8).

$$\left\{ \begin{bmatrix} V_s(\omega_1) \\ 0 \end{bmatrix} = \begin{bmatrix} Z_1(\omega_1) & j\omega_1 M_{12} \\ j\omega_1 M_{12} & Z_2(\omega_1) + \frac{P_L}{|I_2(\omega_1)|^2} \end{bmatrix} \begin{bmatrix} I_1(\omega_1) \\ I_2(\omega_1) \end{bmatrix} \right. \quad (7)$$

$$\left. \begin{bmatrix} V_s(\omega_2) \\ 0 \end{bmatrix} = \begin{bmatrix} Z_1(\omega_2) & j\omega_2 M_{12} \\ j\omega_2 M_{12} & Z_2(\omega_2) + \frac{P_L}{|I_2(\omega_2)|^2} \end{bmatrix} \begin{bmatrix} I_1(\omega_2) \\ I_2(\omega_2) \end{bmatrix} \right\}$$

$$\left\{ \begin{bmatrix} V_s(\omega_1) \\ 0 \\ 0 \end{bmatrix} = \begin{bmatrix} Z_1(\omega_1) & j\omega_1 M_{10} & j\omega_1 M_{12} \\ j\omega_1 M_{10} & Z_0(\omega_1) & j\omega_1 M_{02} \\ j\omega_1 M_{12} & j\omega_1 M_{02} & Z_2(\omega_1) + \frac{P_L}{|I_2(\omega_1)|^2} \end{bmatrix} \begin{bmatrix} I_1(\omega_1) \\ I_0(\omega_1) \\ I_2(\omega_1) \end{bmatrix} \right. \quad (8)$$

$$\begin{bmatrix} V_s(\omega_2) \\ 0 \\ 0 \end{bmatrix} = \begin{bmatrix} Z_1(\omega_2) & j\omega_2 M_{10} & j\omega_2 M_{12} \\ j\omega_2 M_{10} & Z_0(\omega_2) & j\omega_2 M_{02} \\ j\omega_2 M_{12} & j\omega_2 M_{02} & Z_2(\omega_2) + \frac{P_L}{|I_2(\omega_2)|^2} \end{bmatrix} \begin{bmatrix} I_1(\omega_2) \\ I_0(\omega_2) \\ I_2(\omega_2) \end{bmatrix}$$

$$\begin{bmatrix} V_s(\omega_3) \\ 0 \\ 0 \end{bmatrix} = \begin{bmatrix} Z_1(\omega_3) & j\omega_3 M_{10} & j\omega_3 M_{12} \\ j\omega_3 M_{10} & Z_0(\omega_3) & j\omega_3 M_{02} \\ j\omega_3 M_{12} & j\omega_3 M_{02} & Z_2(\omega_3) + \frac{P_L}{|I_2(\omega_3)|^2} \end{bmatrix} \begin{bmatrix} I_1(\omega_3) \\ I_0(\omega_3) \\ I_2(\omega_3) \end{bmatrix}$$

$$\left. \begin{bmatrix} V_s(\omega_4) \\ 0 \\ 0 \end{bmatrix} = \begin{bmatrix} Z_1(\omega_4) & j\omega_4 M_{10} & j\omega_4 M_{12} \\ j\omega_4 M_{10} & Z_0(\omega_4) & j\omega_4 M_{02} \\ j\omega_4 M_{12} & j\omega_4 M_{02} & Z_2(\omega_4) + \frac{P_L}{|I_2(\omega_4)|^2} \end{bmatrix} \begin{bmatrix} I_1(\omega_4) \\ I_0(\omega_4) \\ I_2(\omega_4) \end{bmatrix} \right\}$$

Comparing equation (7) to equation (3) and equation (8) to equation (4), it can be seen that the number of unknowns and the number of equations are the same for each pair of equations. Therefore, theoretically, equation (7) can be solved analytically to get the parameter values for $M_{12}$, $P_L$, $I_2(\omega_1)$ and $I_2(\omega_2)$. Similarly, equation (8) can be solved to get the parameter values for $M_{10}$, $M_{02}$, $M_{12}$, $P_L$, $I_0(\omega_1)$ to $I_0(\omega_4)$, and $I_2(\omega_1)$ to $I_2(\omega_4)$.

Please note that, in equation (7) and equation (8), all of the unknown currents as well as the measured input voltages and currents are complex values. Thus, it is not a straightforward process to get the solutions to these complex matrix equations when the absolute values like $|I_i(\omega_j)|$ are involved. To simplify the process of calculation, we can split or decouple each complex equation into its real part and its imaginary part to form two ordinary equations. Then equation (7) and equation (8) can be rewritten as equation (9) and equation (10), respectively.

$$\left\{\begin{bmatrix}\operatorname{Re}(V_s(\omega_1))\\0\end{bmatrix}=\begin{bmatrix}\operatorname{Re}(Z_1(\omega_1)) & 0\\0 & \operatorname{Re}(Z_2(\omega_1))+\dfrac{P_L}{\operatorname{Re}(I_2(\omega_1))^2+\operatorname{Im}(I_2(\omega_1))^2}\end{bmatrix}\begin{bmatrix}\operatorname{Re}(I_1(\omega_1))\\\operatorname{Re}(I_2(\omega_1))\end{bmatrix}-\begin{bmatrix}\operatorname{Im}(Z_1(\omega_1)) & \omega_1 M_{12}\\\omega_1 M_{12} & \operatorname{Im}(Z_2(\omega_1))\end{bmatrix}\begin{bmatrix}\operatorname{Im}(I_1(\omega_1))\\\operatorname{Im}(I_2(\omega_1))\end{bmatrix}\right. \quad (9)$$

$$\begin{bmatrix}\operatorname{Im}(V_s(\omega_1))\\0\end{bmatrix}=\begin{bmatrix}\operatorname{Re}(Z_1(\omega_1)) & 0\\0 & \operatorname{Re}(Z_2(\omega_1))+\dfrac{P_L}{\operatorname{Re}(I_2(\omega_1))^2+\operatorname{Im}(I_2(\omega_1))^2}\end{bmatrix}\begin{bmatrix}\operatorname{Im}(I_1(\omega_1))\\\operatorname{Im}(I_2(\omega_1))\end{bmatrix}+\begin{bmatrix}\operatorname{Im}(Z_1(\omega_1)) & \omega_1 M_{12}\\\omega_1 M_{12} & \operatorname{Im}(Z_2(\omega_1))\end{bmatrix}\begin{bmatrix}\operatorname{Re}(I_1(\omega_1))\\\operatorname{Re}(I_2(\omega_1))\end{bmatrix}$$

$$\begin{bmatrix}\operatorname{Re}(V_s(\omega_2))\\0\end{bmatrix}=\begin{bmatrix}\operatorname{Re}(Z_1(\omega_2)) & 0\\0 & \operatorname{Re}(Z_2(\omega_2))+\dfrac{P_L}{\operatorname{Re}(I_2(\omega_2))^2+\operatorname{Im}(I_2(\omega_2))^2}\end{bmatrix}\begin{bmatrix}\operatorname{Re}(I_1(\omega_2))\\\operatorname{Re}(I_2(\omega_2))\end{bmatrix}-\begin{bmatrix}\operatorname{Im}(Z_1(\omega_2)) & \omega_2 M_{12}\\\omega_2 M_{12} & \operatorname{Im}(Z_2(\omega_2))\end{bmatrix}\begin{bmatrix}\operatorname{Im}(I_1(\omega_2))\\\operatorname{Im}(I_2(\omega_2))\end{bmatrix}$$

$$\left.\begin{bmatrix}\operatorname{Im}(V_s(\omega_2))\\0\end{bmatrix}=\begin{bmatrix}\operatorname{Re}(Z_1(\omega_2)) & 0\\0 & \operatorname{Re}(Z_2(\omega_2))+\dfrac{P_L}{\operatorname{Re}(I_2(\omega_2))^2+\operatorname{Im}(I_2(\omega_2))^2}\end{bmatrix}\begin{bmatrix}\operatorname{Im}(I_1(\omega_2))\\\operatorname{Im}(I_2(\omega_2))\end{bmatrix}+\begin{bmatrix}\operatorname{Im}(Z_1(\omega_2)) & \omega_2 M_{12}\\\omega_2 M_{12} & \operatorname{Im}(Z_2(\omega_2))\end{bmatrix}\begin{bmatrix}\operatorname{Re}(I_1(\omega_2))\\\operatorname{Re}(I_2(\omega_2))\end{bmatrix}\right\}$$

$$\left\{\begin{bmatrix}\operatorname{Re}(V_s(\omega_i))\\0\\0\end{bmatrix}=\begin{bmatrix}\operatorname{Re}(Z_1(\omega_i)) & 0 & 0\\0 & \operatorname{Re}(Z_0(\omega_i)) & 0\\0 & 0 & \operatorname{Re}(Z_2(\omega_i))+\dfrac{P_L}{\operatorname{Re}(I_2(\omega_i))^2+\operatorname{Im}(I_2(\omega_i))^2}\end{bmatrix}\begin{bmatrix}\operatorname{Re}(I_1(\omega_i))\\\operatorname{Re}(I_0(\omega_i))\\\operatorname{Re}(I_2(\omega_i))\end{bmatrix}-\begin{bmatrix}\operatorname{Im}(Z_1(\omega_i)) & \omega_i M_{10} & \omega_i M_{12}\\\omega_i M_{10} & \operatorname{Re}(Z_0(\omega_i)) & \omega_i M_{02}\\\omega_i M_{12} & \omega_i M_{02} & \operatorname{Im}(Z_2(\omega_i))\end{bmatrix}\begin{bmatrix}\operatorname{Im}(I_1(\omega_i))\\\operatorname{Im}(I_0(\omega_i))\\\operatorname{Im}(I_2(\omega_i))\end{bmatrix}\right. \quad (10)$$

$$\begin{bmatrix}\operatorname{Im}(V_s(\omega_i))\\0\\0\end{bmatrix}=\begin{bmatrix}\operatorname{Re}(Z_1(\omega_i)) & 0 & 0\\0 & \operatorname{Re}(Z_0(\omega_i)) & 0\\0 & 0 & \operatorname{Re}(Z_2(\omega_i))+\dfrac{P_L}{\operatorname{Re}(I_2(\omega_i))^2+\operatorname{Im}(I_2(\omega_i))^2}\end{bmatrix}\begin{bmatrix}\operatorname{Im}(I_1(\omega_i))\\\operatorname{Im}(I_0(\omega_i))\\\operatorname{Im}(I_2(\omega_i))\end{bmatrix}+\begin{bmatrix}\operatorname{Im}(Z_1(\omega_i)) & \omega_i M_{10} & \omega_i M_{12}\\\omega_i M_{10} & \operatorname{Re}(Z_0(\omega_i)) & \omega_i M_{02}\\\omega_i M_{12} & \omega_i M_{02} & \operatorname{Im}(Z_2(\omega_i))\end{bmatrix}\begin{bmatrix}\operatorname{Re}(I_1(\omega_i))\\\operatorname{Re}(I_0(\omega_i))\\\operatorname{Re}(I_2(\omega_i))\end{bmatrix}$$

(Equation (10) is repeated for $i = 1, 2, 3, 4$.)

In equation (9), there are 8 equations but only 6 unknowns: $M_{12}$, $P_L$, $\operatorname{Re}(I_2(\omega_1))$, $\operatorname{Im}(I_2(\omega_1))$, $\operatorname{Re}(I_2(\omega_2))$ and $\operatorname{Im}(I_2(\omega_2))$, so it is sufficient to solve the equation and get the parameter values: $M_{12}$ and $P_L$. Similarly, in equation (10), there are 24 equations and 20 unknowns: $M_{10}$, $M_{12}$, $M_{02}$, $P_L$, $\operatorname{Re}(I_0(\omega_1))$, $\operatorname{Im}(I_0(\omega_1))$, $\operatorname{Re}(I_0(\omega_2))$, $\operatorname{Im}(I_0(\omega_2))$, $\operatorname{Re}(I_0(\omega_3))$, $\operatorname{Im}(I_0(\omega_3))$, $\operatorname{Re}(I_0(\omega_4))$, $\operatorname{Im}(I_0(\omega_4))$, $\operatorname{Re}(I_2(\omega_1))$, $\operatorname{Im}(I_2(\omega_1))$, $\operatorname{Re}(I_2(\omega_2))$, $\operatorname{Im}(I_2(\omega_2))$, $\operatorname{Re}(I_2(\omega_3))$, $\operatorname{IM}(I_2(\omega_3))$, $\operatorname{Re}(I_2(\omega_4))$, $\operatorname{Im}(I_2(\omega_4))$. Thus, it is also sufficient to calculate the parameter values within 4 sets of measurements of the input voltage and input current at 4 different frequencies in order to optimize the operation of the EV wireless charger In equation (8) and equation (10), we treat $M_{10}$ as unknown. In practice, the second transmitter coil is the relay resonator that is used to enhance the magnetic flux. See, the Zhong 2015 article 1. As a result, the relative position and the mutual inductance of the Tx coil-1 A and the relay coil-0 D of the 3-coil system in FIG. 3 and FIG. 6 are known. Therefore, the number of unknowns can be reduced by 1 and voltage and input current. With the parameters known, the previous method for optimizing the operation of the wireless EV charger reported in the Hui '775 PCT application can be used for optimal control of the wireless power system without using any direct measurements of the output load.

$$\left( \begin{bmatrix} V_s(\omega_1) \\ 0 \\ 0 \end{bmatrix} = \begin{bmatrix} Z_1(\omega_1) & j\omega_1 M_{10} & j\omega_1 M_{12} \\ j\omega_1 M_{10} & Z_0(\omega_1) & j\omega_1 M_{02} \\ j\omega_1 M_{12} & j\omega_1 M_{02} & Z_2(\omega_1) + \frac{P_L}{|I_2(\omega_1)|^2} \end{bmatrix} \begin{bmatrix} I_1(\omega_1) \\ I_0(\omega_1) \\ I_2(\omega_1) \end{bmatrix} \right. \tag{11}$$

$$\begin{bmatrix} V_s(\omega_2) \\ 0 \\ 0 \end{bmatrix} = \begin{bmatrix} Z_1(\omega_2) & j\omega_2 M_{10} & j\omega_2 M_{12} \\ j\omega_2 M_{10} & Z_0(\omega_2) & j\omega_2 M_{02} \\ j\omega_2 M_{12} & j\omega_2 M_{02} & Z_2(\omega_2) + \frac{P_L}{|I_2(\omega_2)|^2} \end{bmatrix} \begin{bmatrix} I_1(\omega_2) \\ I_0(\omega_2) \\ I_2(\omega_2) \end{bmatrix}$$

$$\left. \begin{bmatrix} V_s(\omega_3) \\ 0 \\ 0 \end{bmatrix} = \begin{bmatrix} Z_1(\omega_3) & j\omega_3 M_{10} & j\omega_3 M_{12} \\ j\omega_3 M_{10} & Z_0(\omega_3) & j\omega_3 M_{02} \\ j\omega_3 M_{12} & j\omega_3 M_{02} & Z_2(\omega_3) + \frac{P_L}{|I_2(\omega_3)|^2} \end{bmatrix} \begin{bmatrix} I_1(\omega_3) \\ I_0(\omega_3) \\ I_2(\omega_3) \end{bmatrix} \right)$$

$$\left( \begin{bmatrix} \mathrm{Re}(V_s(\omega_1)) \\ 0 \\ 0 \end{bmatrix} = \begin{bmatrix} \mathrm{Re}(Z_1(\omega_1)) & 0 & 0 \\ 0 & \mathrm{Re}(Z_0(\omega_1)) & 0 \\ 0 & 0 & \mathrm{Re}(Z_2(\omega_1)) + \frac{P_L}{\mathrm{Re}(I_2(\omega_1))^2 + \mathrm{Im}(I_2(\omega_1))^2} \end{bmatrix} \begin{bmatrix} \mathrm{Re}(I_1(\omega_1)) \\ \mathrm{Re}(I_0(\omega_1)) \\ \mathrm{Re}(I_2(\omega_1)) \end{bmatrix} - \begin{bmatrix} \mathrm{Im}(Z_1(\omega_1)) & \omega_1 M_{10} & \omega_1 M_{12} \\ \omega_1 M_{10} & \mathrm{Re}(Z_0(\omega_1)) & \omega_1 M_{02} \\ \omega_1 M_{12} & \omega_1 M_{02} & \mathrm{Im}(Z_2(\omega_1)) \end{bmatrix} \begin{bmatrix} \mathrm{Im}(I_1(\omega_1)) \\ \mathrm{Im}(I_0(\omega_1)) \\ \mathrm{Im}(I_2(\omega_1)) \end{bmatrix} \right. \tag{12}$$

$$\begin{bmatrix} \mathrm{Im}(V_s(\omega_1)) \\ 0 \\ 0 \end{bmatrix} = \begin{bmatrix} \mathrm{Re}(Z_1(\omega_1)) & 0 & 0 \\ 0 & \mathrm{Re}(Z_0(\omega_1)) & 0 \\ 0 & 0 & \mathrm{Re}(Z_2(\omega_1)) + \frac{P_L}{\mathrm{Re}(I_2(\omega_1))^2 + \mathrm{Im}(I_2(\omega_1))^2} \end{bmatrix} \begin{bmatrix} \mathrm{Im}(I_1(\omega_1)) \\ \mathrm{Im}(I_0(\omega_1)) \\ \mathrm{Im}(I_2(\omega_1)) \end{bmatrix} + \begin{bmatrix} \mathrm{Im}(Z_1(\omega_1)) & \omega_1 M_{10} & \omega_1 M_{12} \\ \omega_1 M_{10} & \mathrm{Re}(Z_0(\omega_1)) & \omega_1 M_{02} \\ \omega_1 M_{12} & \omega_1 M_{02} & \mathrm{Im}(Z_2(\omega_1)) \end{bmatrix} \begin{bmatrix} \mathrm{Re}(I_1(\omega_1)) \\ \mathrm{Re}(I_0(\omega_1)) \\ \mathrm{Re}(I_2(\omega_1)) \end{bmatrix}$$

$$\begin{bmatrix} \mathrm{Re}(V_s(\omega_2)) \\ 0 \\ 0 \end{bmatrix} = \begin{bmatrix} \mathrm{Re}(Z_1(\omega_2)) & 0 & 0 \\ 0 & \mathrm{Re}(Z_0(\omega_2)) & 0 \\ 0 & 0 & \mathrm{Re}(Z_2(\omega_2)) + \frac{P_L}{\mathrm{Re}(I_2(\omega_2))^2 + \mathrm{Im}(I_2(\omega_2))^2} \end{bmatrix} \begin{bmatrix} \mathrm{Re}(I_1(\omega_2)) \\ \mathrm{Re}(I_0(\omega_2)) \\ \mathrm{Re}(I_2(\omega_2)) \end{bmatrix} - \begin{bmatrix} \mathrm{Im}(Z_1(\omega_2)) & \omega_2 M_{10} & \omega_2 M_{12} \\ \omega_2 M_{10} & \mathrm{Re}(Z_0(\omega_2)) & \omega_2 M_{02} \\ \omega_2 M_{12} & \omega_2 M_{02} & \mathrm{Im}(Z_2(\omega_2)) \end{bmatrix} \begin{bmatrix} \mathrm{Im}(I_1(\omega_2)) \\ \mathrm{Im}(I_0(\omega_2)) \\ \mathrm{Im}(I_2(\omega_2)) \end{bmatrix}$$

$$\begin{bmatrix} \mathrm{Im}(V_s(\omega_2)) \\ 0 \\ 0 \end{bmatrix} = \begin{bmatrix} \mathrm{Re}(Z_1(\omega_2)) & 0 & 0 \\ 0 & \mathrm{Re}(Z_0(\omega_2)) & 0 \\ 0 & 0 & \mathrm{Re}(Z_2(\omega_2)) + \frac{P_L}{\mathrm{Re}(I_2(\omega_2))^2 + \mathrm{Im}(I_2(\omega_2))^2} \end{bmatrix} \begin{bmatrix} \mathrm{Im}(I_1(\omega_2)) \\ \mathrm{Im}(I_0(\omega_2)) \\ \mathrm{Im}(I_2(\omega_2)) \end{bmatrix} + \begin{bmatrix} \mathrm{Im}(Z_1(\omega_2)) & \omega_2 M_{10} & \omega_2 M_{12} \\ \omega_2 M_{10} & \mathrm{Re}(Z_0(\omega_2)) & \omega_2 M_{02} \\ \omega_2 M_{12} & \omega_2 M_{02} & \mathrm{Im}(Z_2(\omega_2)) \end{bmatrix} \begin{bmatrix} \mathrm{Re}(I_1(\omega_2)) \\ \mathrm{Re}(I_0(\omega_2)) \\ \mathrm{Re}(I_2(\omega_2)) \end{bmatrix}$$

$$\begin{bmatrix} \mathrm{Re}(V_s(\omega_3)) \\ 0 \\ 0 \end{bmatrix} = \begin{bmatrix} \mathrm{Re}(Z_1(\omega_3)) & 0 & 0 \\ 0 & \mathrm{Re}(Z_0(\omega_3)) & 0 \\ 0 & 0 & \mathrm{Re}(Z_2(\omega_3)) + \frac{P_L}{\mathrm{Re}(I_2(\omega_3))^2 + \mathrm{Im}(I_2(\omega_3))^2} \end{bmatrix} \begin{bmatrix} \mathrm{Re}(I_1(\omega_3)) \\ \mathrm{Re}(I_0(\omega_3)) \\ \mathrm{Re}(I_2(\omega_3)) \end{bmatrix} - \begin{bmatrix} \mathrm{Im}(Z_1(\omega_3)) & \omega_3 M_{10} & \omega_3 M_{12} \\ \omega_3 M_{10} & \mathrm{Re}(Z_0(\omega_3)) & \omega_3 M_{02} \\ \omega_3 M_{12} & \omega_3 M_{02} & \mathrm{Im}(Z_2(\omega_3)) \end{bmatrix} \begin{bmatrix} \mathrm{Im}(I_1(\omega_3)) \\ \mathrm{Im}(I_0(\omega_3)) \\ \mathrm{Im}(I_2(\omega_3)) \end{bmatrix}$$

$$\left. \begin{bmatrix} \mathrm{Im}(V_s(\omega_3)) \\ 0 \\ 0 \end{bmatrix} = \begin{bmatrix} \mathrm{Re}(Z_1(\omega_3)) & 0 & 0 \\ 0 & \mathrm{Re}(Z_0(\omega_3)) & 0 \\ 0 & 0 & \mathrm{Re}(Z_2(\omega_3)) + \frac{P_L}{\mathrm{Re}(I_2(\omega_3))^2 + \mathrm{Im}(I_2(\omega_3))^2} \end{bmatrix} \begin{bmatrix} \mathrm{Im}(I_1(\omega_3)) \\ \mathrm{Im}(I_0(\omega_3)) \\ \mathrm{Im}(I_2(\omega_3)) \end{bmatrix} + \begin{bmatrix} \mathrm{Im}(Z_1(\omega_3)) & \omega_3 M_{10} & \omega_3 M_{12} \\ \omega_3 M_{10} & \mathrm{Re}(Z_0(\omega_3)) & \omega_3 M_{02} \\ \omega_3 M_{12} & \omega_3 M_{02} & \mathrm{Im}(Z_2(\omega_3)) \end{bmatrix} \begin{bmatrix} \mathrm{Re}(I_1(\omega_3)) \\ \mathrm{Re}(I_0(\omega_3)) \\ \mathrm{Re}(I_2(\omega_3)) \end{bmatrix} \right)$$

only 3 different sets of measurements (e.g. using 3 different frequencies or 3 different magnitudes of input voltage) of the input voltage and input current are necessary to identify the needed parameters of the system as shown in equation (11) and equation (12).

In equation (11), there are 9 unknowns: $M_{02}$, $M_{12}$, $R_L$, $I_0(\omega_1)$ to $I_0(\omega_3)$, $I_2(\omega_1)$ to $I_2(\omega_3)$, and a total of 9 equations, so the solutions for $M_{02}$, $M_{12}$ and $R_L$ are theoretically obtained. In equation (12), there are 18 equations but 15 unknowns: $M_{02}$, $M_{12}$, $P_L$, $\mathrm{Re}(I_0(\omega_1))$ to $\mathrm{Re}(I_0(\omega_3))$, $\mathrm{Im}(I_0(\omega_1))$ to $\mathrm{Im}(I_0(\omega_3))$, $\mathrm{Re}(I_2(\omega_1))$ to $\mathrm{Re}(I_2(\omega_1))$, $\mathrm{Im}(I_2(\omega_1))$ to $\mathrm{Im}(I_2(\omega_3))$. Therefore, it is sufficient to get the needed parameters with 3 different sets of measurements of the input Once the estimated values of the required parameters such as the mutual-inductances and load resistance $R_L$ or load power $P_L$ have been obtained, there is still a possibility that the estimated values of a certain parameter may not converge to the same value, because the calculated values are adversely affected by system parameter tolerance and/or measurement noise. In order to obtain an estimated value with improved accuracy, the least square approximation method can be used to obtain the best estimated values from all of estimated values derived from tests at different frequencies.

In equation (7) and equation (8), different frequencies are used to get the measurements so that there are sufficient equations to calculate the needed system parameters. Actually, if the load is operated at constant power mode, different input voltages can be used at the same frequency, which can provide enough power to the load and get enough equations to calculate the system parameters as shown in equation (13) and equation (14) for 2-coil system (FIG. 5) and 3-coil system (FIG. 6), respectively, where $V_{Si}(\omega_1)$ is the input voltage of the $i^{th}$ measurement, $I_{ji}(\omega_1)$ is the current flow through the $j^{th}$ coil of the $i^{th}$ measurement. For equation (14), we can also use different voltages and/or different frequencies to form the matrix equation as shown in equation (15) to also calculate the system parameters.

$$\left\{ \begin{bmatrix} V_{S1}(\omega_1) \\ 0 \end{bmatrix} = \begin{bmatrix} Z_1(\omega_1) & j\omega_1 M_{12} \\ j\omega_1 M_{12} & Z_2(\omega_1) + \frac{P_L}{|I_{21}(\omega_1)|^2} \end{bmatrix} \begin{bmatrix} I_{11}(\omega_1) \\ I_{21}(\omega_1) \end{bmatrix} \right. \quad (13)$$
$$\left. \begin{bmatrix} V_{S2}(\omega_1) \\ 0 \end{bmatrix} = \begin{bmatrix} Z_1(\omega_1) & j\omega_1 M_{12} \\ j\omega_1 M_{12} & Z_2(\omega_1) + \frac{P_L}{|I_{22}(\omega_1)|^2} \end{bmatrix} \begin{bmatrix} I_{12}(\omega_1) \\ I_{22}(\omega_1) \end{bmatrix} \right.$$

$$\left\{ \begin{bmatrix} V_{S1}(\omega_1) \\ 0 \\ 0 \end{bmatrix} = \begin{bmatrix} Z_1(\omega_1) & j\omega_1 M_{10} & j\omega_1 M_{12} \\ j\omega_1 M_{10} & Z_0(\omega_1) & j\omega_1 M_{02} \\ j\omega_1 M_{12} & j\omega_1 M_{02} & Z_2(\omega_1) + \frac{P_L}{|I_{21}(\omega_1)|^2} \end{bmatrix} \begin{bmatrix} I_{11}(\omega_1) \\ I_{01}(\omega_1) \\ I_{21}(\omega_1) \end{bmatrix} \right. \quad (14)$$

$$\begin{bmatrix} V_{S2}(\omega_1) \\ 0 \\ 0 \end{bmatrix} = \begin{bmatrix} Z_1(\omega_1) & j\omega_1 M_{10} & j\omega_1 M_{12} \\ j\omega_1 M_{10} & Z_0(\omega_1) & j\omega_1 M_{02} \\ j\omega_1 M_{12} & j\omega_1 M_{02} & Z_2(\omega_1) + \frac{P_L}{|I_{22}(\omega_1)|^2} \end{bmatrix} \begin{bmatrix} I_{12}(\omega_1) \\ I_{02}(\omega_1) \\ I_{22}(\omega_1) \end{bmatrix}$$

$$\begin{bmatrix} V_{S3}(\omega_1) \\ 0 \\ 0 \end{bmatrix} = \begin{bmatrix} Z_1(\omega_1) & j\omega_1 M_{10} & j\omega_1 M_{12} \\ j\omega_1 M_{10} & Z_0(\omega_1) & j\omega_1 M_{02} \\ j\omega_1 M_{12} & j\omega_1 M_{02} & Z_2(\omega_1) + \frac{P_L}{|I_{23}(\omega_1)|^2} \end{bmatrix} \begin{bmatrix} I_{13}(\omega_1) \\ I_{03}(\omega_1) \\ I_{23}(\omega_1) \end{bmatrix}$$

$$\left. \begin{bmatrix} V_{S4}(\omega_1) \\ 0 \\ 0 \end{bmatrix} = \begin{bmatrix} Z_1(\omega_1) & j\omega_1 M_{10} & j\omega_1 M_{12} \\ j\omega_1 M_{10} & Z_0(\omega_1) & j\omega_1 M_{02} \\ j\omega_1 M_{12} & j\omega_1 M_{02} & Z_2(\omega_1) + \frac{P_L}{|I_{24}(\omega_1)|^2} \end{bmatrix} \begin{bmatrix} I_{14}(\omega_1) \\ I_{04}(\omega_1) \\ I_{24}(\omega_1) \end{bmatrix} \right.$$

$$\left\{ \begin{bmatrix} V_{S1}(\omega_1) \\ 0 \\ 0 \end{bmatrix} = \begin{bmatrix} Z_1(\omega_1) & j\omega_1 M_{10} & j\omega_1 M_{12} \\ j\omega_1 M_{10} & Z_0(\omega_1) & j\omega_1 M_{02} \\ j\omega_1 M_{12} & j\omega_1 M_{02} & Z_2(\omega_1) + \frac{P_L}{|I_{21}(\omega_1)|^2} \end{bmatrix} \begin{bmatrix} I_{11}(\omega_1) \\ I_{01}(\omega_1) \\ I_{21}(\omega_1) \end{bmatrix} \right. \quad (15)$$

$$\begin{bmatrix} V_{S2}(\omega_1) \\ 0 \\ 0 \end{bmatrix} = \begin{bmatrix} Z_1(\omega_1) & j\omega_1 M_{10} & j\omega_1 M_{12} \\ j\omega_1 M_{10} & Z_0(\omega_1) & j\omega_1 M_{02} \\ j\omega_1 M_{12} & j\omega_1 M_{02} & Z_2(\omega_1) + \frac{P_L}{|I_{22}(\omega_1)|^2} \end{bmatrix} \begin{bmatrix} I_{12}(\omega_1) \\ I_{02}(\omega_1) \\ I_{22}(\omega_1) \end{bmatrix}$$

$$\begin{bmatrix} V_{S1}(\omega_2) \\ 0 \\ 0 \end{bmatrix} = \begin{bmatrix} Z_1(\omega_2) & j\omega_2 M_{10} & j\omega_2 M_{12} \\ j\omega_2 M_{10} & Z_0(\omega_2) & j\omega_2 M_{02} \\ j\omega_2 M_{12} & j\omega_2 M_{02} & Z_2(\omega_1) + \frac{P_L}{|I_{21}(\omega_2)|^2} \end{bmatrix} \begin{bmatrix} I_{11}(\omega_2) \\ I_{01}(\omega_2) \\ I_{21}(\omega_2) \end{bmatrix}$$

$$\left. \begin{bmatrix} V_{S2}(\omega_2) \\ 0 \\ 0 \end{bmatrix} = \begin{bmatrix} Z_1(\omega_2) & j\omega_2 M_{10} & j\omega_2 M_{12} \\ j\omega_2 M_{10} & Z_0(\omega_2) & j\omega_2 M_{02} \\ j\omega_2 M_{12} & j\omega_2 M_{02} & Z_2(\omega_2) + \frac{P_L}{|I_{22}(\omega_2)|^2} \end{bmatrix} \begin{bmatrix} I_{12}(\omega_2) \\ I_{02}(\omega_2) \\ I_{22}(\omega_2) \end{bmatrix} \right.$$

Theoretically, the solution of $M_{12}$ and $P_L$ can be obtained from equation (13) for the 2-coil system, and the solution of $M_{02}$, $M_{12}$ and $P_L$ can be obtained for the 3-coil system from equation (14) or equation (15). The system parameters can then be used to optimize the operation of the EV wireless charger.

Figure 8:
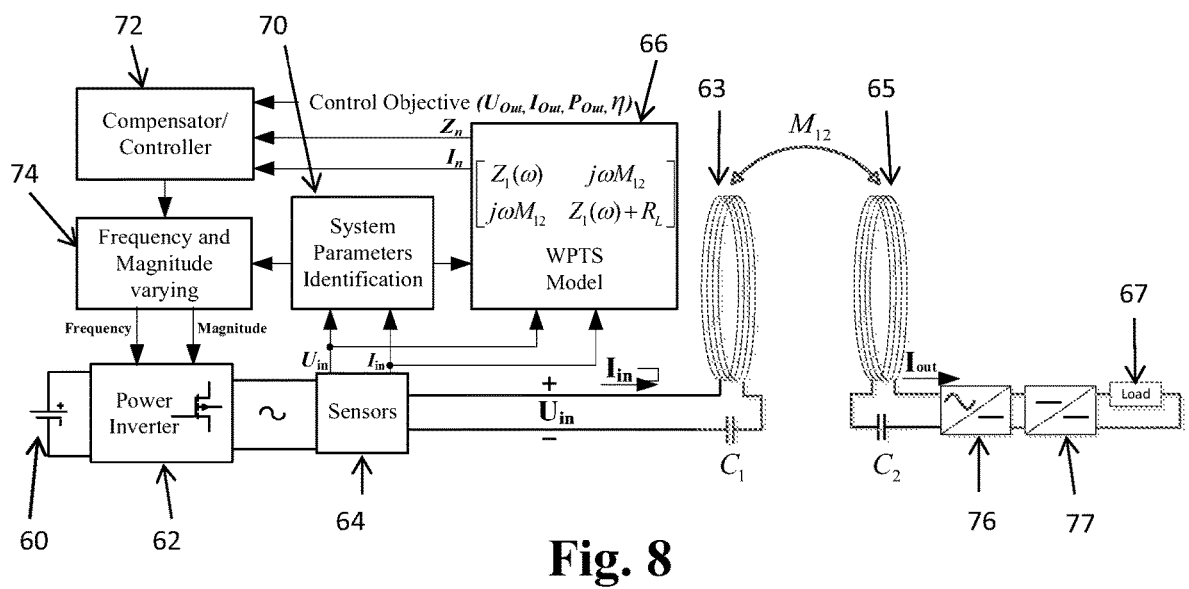
FIG. 8 is a block diagram of a 2-coil EV wireless charging system with ac/dc and dc/dc converters, and with unknown system parameters which, according to the present invention, does not use feedback from the receiver for control purposes.

FIG. 8 is the block diagram of a 2-coil EV wireless charging system with ac/dc and dc/dc converters, and with unknown system parameters. This charging system does not use feedback from the receiver for control purposes. The parameters of the wireless power transfer system except $M_{12}$ and $R_L$ (or $P_L$) are presumed to be known, i.e., all coil resistance, inductance and capacitance are given.

Once the system is initialized, based either on input voltage and current, or input power, the System Parameters Identification unit 70 provides the parameters $M_{12}$ and $R_L$ (or $P_L$) to the WPTS Model 66, which determines the system outputs variables of $U_{out}$, $I_{out}$, $P_{out}$ and $\eta$ as in the Yin 2015 article. These variables are applied to compensator/controller 72 along with a control objective signal that determines the operating mode of the system. Controller 72 creates the signals that drive the Frequency and Magnitude Variation circuit 74. Based on the output of circuit 74, system parameters are determined at different frequencies or magnitudes in order to establish a sufficient number of equations to determine the unknown parameters.

If the active source is a dc source 60, an inverter 62 with an output filter is used to generate a sinusoidal voltage with controllable frequency and magnitude for driving the first coil, i.e., Transmitter Coil 63. The selected frequencies and/or magnitudes for inverter 62 are set by circuit 74. Therefore, the input power is provided by energizing the Transmitter Coil and such power will be wirelessly transmitted to the last (Receiver) Coil 65 for powering the load 67. Since according to the invention, measurements on the output load are to be eliminated; only the input voltage and the input current can be relied upon for output power control. Note that in the arrangement of FIG. 8 the output load can be connected either in series with the last LC resonator or in parallel across the capacitor of the last LC resonator.

A sensor Block 64 detects the voltage and current outputs of the inverter 62, which drive the transmitter coil 63. The sensor Block 62 outputs input voltage $U_{in}$ and input current $I_{in}$ to the system parameter identification Block 70. The parameters generated by Block 70 at particular frequencies and/or magnitudes are provided to the frequency and magnitude varying circuit 74 as well as to the WPTS model 66. Further, the input voltage $U_{in}$ and input current $I_{in}$ are also applied to WPTS model 66.

The equations (4), (9) or (13) may be implemented and solved in system parameter identification Block 70. Note that these equations require the input voltage and input current only. Block 70 may be a microprocessor programmed to execute equation (4), (9) or (13) or some hardware device to perform the same function, such as a programmable gate array or application specific integrated circuit (ASIC).

In the operation of the circuit of FIG. 8, the Block 70 solves the equations with the (known) measured values of $U_{in}$, $I_{in}$ in order to obtain $M_{12}$ and $R_L$ (or $P_L$). The calculations are made continuously at a high sampling rate (usually limited by the speed of the processor) to provide instantaneous output information for control and feedback. Such calculated values can be fed into any control scheme to meet the specific control objectives of the wireless power transfer system. Based on the chosen control scheme, e.g., control objective signal, the power inverter 62 is operated so that it generates the appropriate sinusoidal voltage at a controllable frequency and magnitude to meet the output power demand of the load 67 according to the control objective. Note that load 67 receives the a.c. voltage from receiver coil 65 after it has been ac/dc converted in circuit 76 and dc/dc converted in circuit 77.

Figure 9:
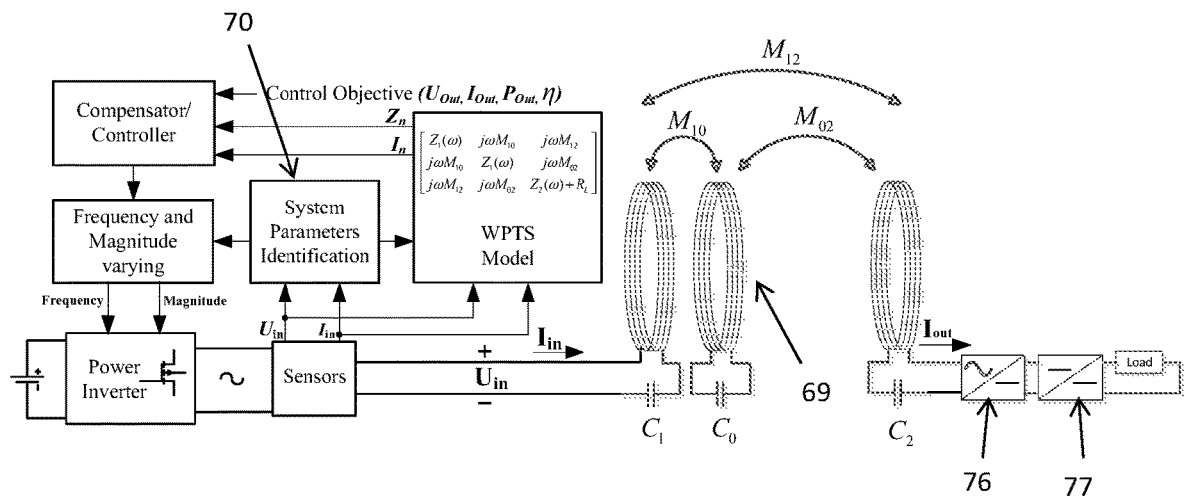
FIG. 9 is a block diagram of a 3-coil EV wireless charging system with ac/dc and dc/dc converters, and with unknown system parameters which, according to the present invention, does not use feedback from the receiver for control purposes.

FIG. 9 is the block diagram of a 3-coil EV wireless charging system according to the present invention, i.e., unknown system parameters are determined without the use of feedback from the receiver coil for control purposes. It is structurally the same as the diagram of FIG. 8, except that it includes a relay coil 69. Thus, it includes ac/dc converter 76 and dc/dc converter 77. Further, it includes the features of the Zhong 2015 article 1, in particular the current stress is shifted from the primary driving circuit to the relay resonator and a large relay current is generated to maximize the magnetic coupling with the receiver coil for efficient power transfer. The equation (6), (or equation (10), or equation (12), or equation (14), or equation (15)) may be implemented and solved in system parameter identification Block 70 to obtain $M_{10}$, $M_{12}$, $M_{02}$ and $R_L$ or $P_L$. Also these equations require the input voltage and input current only.

For a 2-coil wireless charging system, Equation (4), or (9), or (13) can be used to calculate the mutual-inductance $M_{12}$ and the load resistance $R_L$ (or load power $P_L$) to make the whole wireless charging system transparent. Therefore the input frequency and voltage can be directly controlled, and it can be ensured that the system will be operated at its optimal point. Therefore, the proposed method of this invention can also be linked with the maximum-efficiency tracking method proposed in the article, W. Zhong and S. Hui, "Maximum Energy Efficiency Tracking for Wireless Power Transfer Systems", *IEEE Transactions on Power Electronics*, vol. 30, pp. 4025-34, 2015 (the "Zhong 2015 article 2"), which is incorporated herein in its entirety. For the 2-coil wireless charging system of FIG. 8 the model is quite simple as shown in equation (3), and it can be rewritten as equation (16).

$$\begin{bmatrix} V_s(\omega) \\ 0 \end{bmatrix} = \begin{bmatrix} R_1 + j\omega L_1 & j\omega M_{12} \\ j\omega M_{12} & R_2 + j\omega L_2 + R_L \end{bmatrix} \begin{bmatrix} I_1(\omega) \\ I_2(\omega) \end{bmatrix} \quad (16)$$

Assuming $V_s(\omega) = U$, from equation (3), we can get:

$$I_1(\omega) = \frac{U(R_2 + R_L + j\omega L_2)}{(R_1 + j\omega L_1)(R_2 + R_L + j\omega L_2) + \omega^2 M_{12}^2} \quad (17)$$

$$I_2(\omega) = \frac{-j\omega M_{12} U}{(R_1 + j\omega L_1)(R_2 + R_L + j\omega L_2) + \omega^2 M_{12}^2} \quad (18)$$

And further, we can get the input power, output power and system efficiency as shown below:

$$P_{in} = \frac{U^2 \left( R_1\left((R_2 + R_L)^2 + \omega^2 L_2^2 + \frac{1}{\omega^2 C_2^2} - \frac{2L_2}{C_2}\right) + \omega^2 M_{12}^2(R_2 + \omega R_L) \right)}{\left(\omega^2 M_{12}^2 + R_1 R_2 + R_1 R_L - \left(\omega L_1 - \frac{1}{\omega C_1}\right)\left(\omega L_2 - \frac{1}{\omega C_2}\right)\right)^2 + \left(\left(\omega L_1 - \frac{1}{\omega C_1}\right)(R_2 + R_L) + \left(\omega L_2 - \frac{1}{\omega C_2}\right)R_1\right)^2} \quad (19)$$

$$P_{out} = \frac{U^2 \omega^2 M_{12}^2 R_L}{\left(\omega^2 M_{12}^2 + R_1 R_2 + R_1 R_L - \left(\omega L_1 - \frac{1}{\omega C_1}\right)\left(\omega L_2 - \frac{1}{\omega C_2}\right)\right)^2 + \left(\left(\omega L_1 - \frac{1}{\omega C_1}\right)(R_2 + R_L) + \left(\omega L_2 - \frac{1}{\omega C_2}\right)R_1\right)^2} \quad (20)$$

$$\eta = \frac{\omega^2 M_{12}^2 R_L}{R_1\left((R_2 + R_L)^2 + \omega^2 L_2^2 + \frac{1}{\omega^2 C_2^2} - \frac{2L_2}{C_2}\right) + \omega^2 M_{12}^2(R_2 + \omega R_L)} \quad (21)$$

Figure 10:
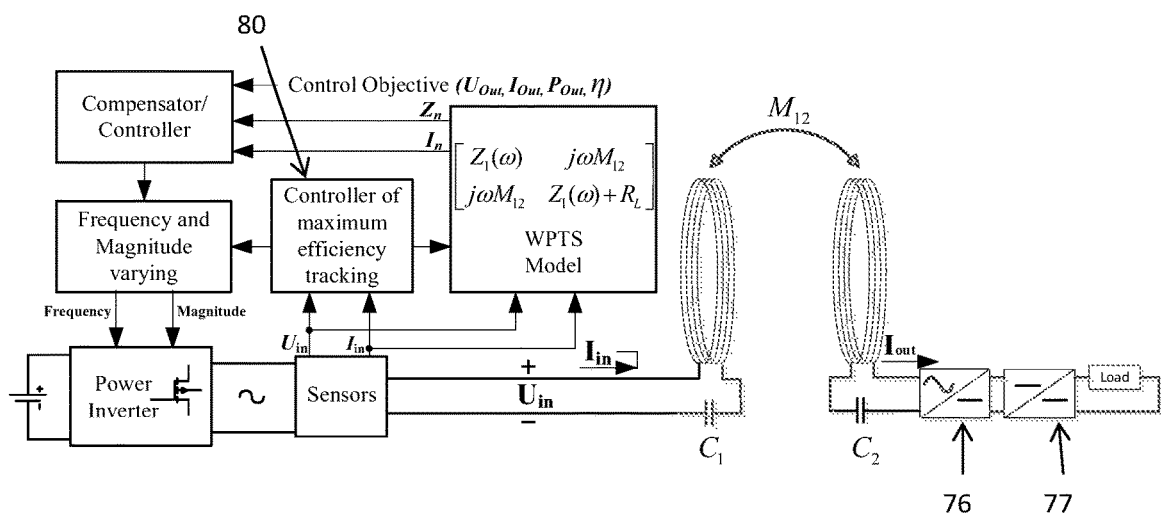
FIG. 10 is a block diagram of a 2-coil EV wireless charging system with ac/dc and dc/dc converters, maximum energy efficiency tracking and with unknown system parameters determination which, according to the present invention, does not use feedback from the receiver for control purposes

FIG. 10 is the block diagram of a 2-coil EV wireless charging system with the features of the Zhong 2015 article 2 included, and with ac/dc converter 76 and dc/dc converter 77. It also includes unknown system parameters which are determined without the use of feedback from the receiver for control purposes according to the present invention. In the arrangement of FIG. 10, the system parameters identification circuit 70 is replaced with a controller of maximum efficiency tracking circuit 80 that operates as described in the Zhong 2015 article 2. In particular, the switching mode converter 76 in the receiver is operated to emulate the optimal load. The tracking circuit 80 causes the system to follow the maximum energy efficiency operating points of the wireless power transfer system by searching for the minimum input power operating point for a given output power. Since this search is carried out on the transmitter side there is no requirement for any wireless communication feedback from the receiver side.

Figure 11:
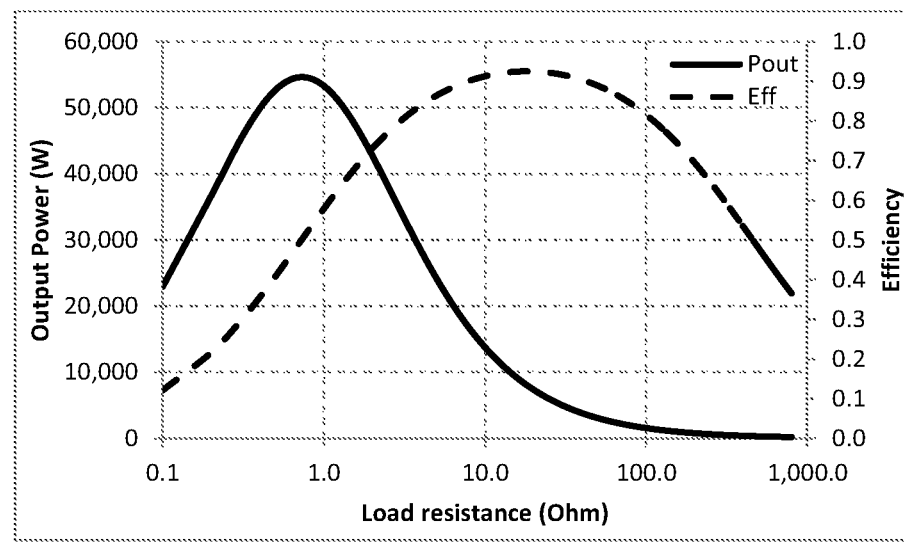
FIG. 11 shows graphs of the output power and efficiency versus the load resistance for the circuit of FIG. 10.
Figure 12:
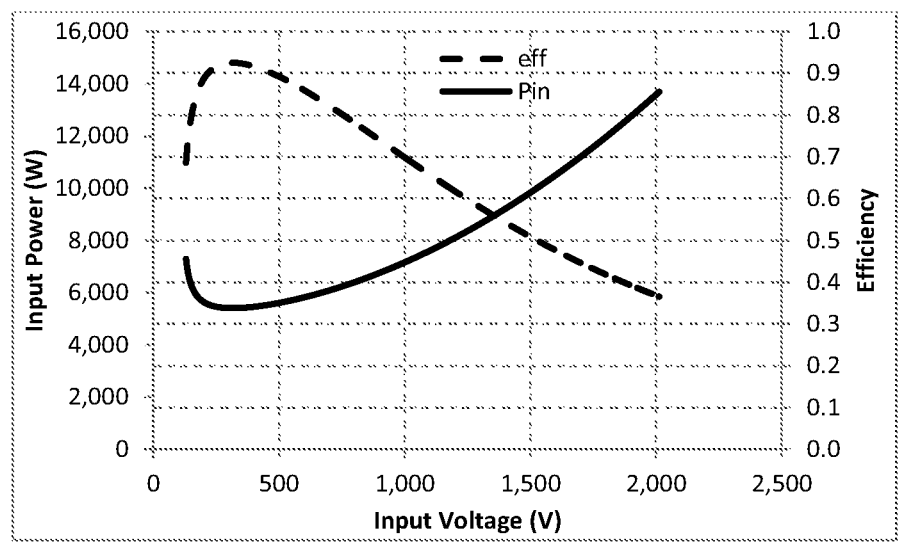
FIG. 12 shows graphs of the input power and efficiency versus the input voltage for the circuit of FIG. 10.

If the system parameters are assumed to be the same as the system discussed with respect to equation (13) and the Zhong 2015 article 2, $L_1 = 105.35$ µH, $L_2 = 105.67$ µH, $M = 46.107$ µH, $C_1 = 12.61$ nF, $C_2 = 12.57$ nF, $R_1 = R_2 = 0.2$ Ohm, and $U = 400$ V, operating frequency $f = 138$ kHz (the resonant frequency of transmitter and also of the receiver), then the curves of $P_{out}$ vs. $R_L$ and $E_{ff}$ vs. $R_L$ are as shown in FIG. 11, and the curves of $E_{ff}$ and $P_{in}$ vs. input voltage when there is 5000 W of constant output power are shown in FIG. 12. FIG. 12 shows that if the load power is controlled by the battery charging controller to constant power (in FIG. 9, $P_{out} = 5000$ W) properly, the input power can be simply measured and the input voltage can be simply tuned to find the minimum point of input power as in the Zhong 2015 article 2. That is exactly the optimal operating point; i.e., where the system efficiency is highest and output power can fit the demand.

While the invention has been particularly shown and described with reference to preferred embodiments thereof, it will be understood by those skilled in the art that various changes in form and details may be made therein without departing from the spirit and scope of the invention. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What we claimed is:

1. A fast method for determining mutual inductance terms representing the misalignment and distance between at least a transmitter coil and a magnetically coupled receiver coil in a wireless power charging system having a transmitter that receives input voltage and current that generates an electromagnetic field in the transmitter coil, and a receiver with the receiver coil that receives power from the electromagnetic field and uses it to charge a load battery, comprising the steps of:

exciting the transmitter coil of the wireless power charging system under different conditions of frequency and/or input voltage/currents measuring the response of the transmitter to the excitation in order to provide enough equivalent circuit system equations to at least match the number of unknowns in the system equations, so that the unknowns, including at least the mutual inductance terms and the load impedance or load power, can be calculated with the knowledge of the input voltage and input current of the transmitter coil, but without feedback from the receiver coil;

solving the system equations; and optimizing the wireless power charging system based on the solved system equations.

2. The method of claim 1 wherein the different conditions are different frequencies at which the transmitter coil is excited.

3. The method of claim 2 wherein the excitation of the transmitter coil is at several frequencies around the resonant frequency of the tuned resonance of the transmitter coil and the receiver coil for operation at or near the resonant frequency to cause optimal or near-optimal energy efficiency.

4. The method of claim 2 wherein the minimum number of the frequencies is equal to or more than the number of unknowns, and the unknowns comprise at least the mutual inductance terms between the coils and the load power or load impedance.

5. The method of claim 4 wherein the number of the frequencies is larger than the minimum number required to match the number of equations with that of the unknowns; and further including the step of using a least square algorithm to achieve good accuracy for the parameters.

6. The method of claim 1 wherein the different conditions are different input voltages/currents.

7. The method of claim 6 wherein the load is a constant-resistance type or a constant-power type during short periods of time, and different voltage/current magnitudes are used to excite the transmitter in order to generate all the required number of equations or some of the required number of equations.

8. The method of claim 1 wherein the wireless power charging system further includes at least one relay coil between the transmitter coil and the receiver coil, said relay coil receiving electromagnetic field from the transmitter coil and sending it to the receiver coil.

9. The method of claim 8 wherein the excitation of the transmitter coil is at several frequencies around the resonant frequency of the tuned resonance of the transmitter coil, the relay coil and the receiver coil for operation at or near the resonant frequency to cause optimal or near-optimal energy efficiency.

10. The method of claim 1 wherein once the mutual inductance terms and the load impedance or load power are determined, the step of optimizing involves choosing a proper operating frequency and input voltage/current to cause the wireless power charging system to operate at a maximum efficiency point and to match the charging power demand.

11. The method of claim 1 further including the step of operating the load in a constant power mode, and wherein once the mutual inductance terms and the load power are determined, the step of optimizing involves choosing an optimal or near-optimal operating frequency, and then changing only the input voltage to find the maximum efficiency operating point, and causing the system to stay at the maximum efficiency operating point even if the load power slowly changes within a small range.

12. A wireless power charging system comprising:

a transmitter that receives input voltage and current and generates an electromagnetic field in a transmitter coil;

a receiver with a receiver coil that receives power from the electromagnetic field and uses it to charge a load battery;

a controller that excites the transmitter coil of the wireless power charging system under different conditions of frequency and/or voltage/currents and measuring the response of the transmitter to the excitation, said controller exciting the transmitter coil a sufficient number of times to provide enough equivalent circuit system equations to at least match the number of unknowns, including at least the mutual inductance terms between the coils and the load impedance or load power in the system equations; and a processor that uses the measurements with the knowledge of the input voltage and input current of the transmitter coil to determine the mutual inductance terms representing the misalignment and distance between the transmitter coil and the receiver coil, said processor further solving the system equations and optimizing the wireless power charging system based on the solved system equations by setting an operating frequency, and the input voltage and current.

13. The wireless power charging system of claim 12 wherein the controller excites the transmitter coil at different frequencies.

14. The wireless power charging system of claim 13 wherein the excitation of the transmitter coil is at several frequencies around the resonant frequency of the tuned resonance of the transmitter coil and the receiver coil for operation at or near the resonant frequency to cause optimal or near-optimal energy efficiency.

15. The wireless power charging system of claim 14 wherein the excitation of the transmitter coil by the controller is at several frequencies around the resonant frequency of the tuned resonance of the transmitter coil, the relay coil and the receiver coil for operation at or near the resonant frequency to cause optimal or near-optimal energy efficiency.

16. The wireless power charging system of claim 13 wherein the minimum number of the frequencies is equal to or more than the number of unknowns in the system equations, and the unknowns comprise at least the mutual inductance terms between the coils and the load power or load impedance.

17. The wireless power charging system of claim 16 wherein the number of the frequencies is larger than the minimum number required to match the number of equations with that of the unknowns; and further including the step of using a least square algorithm to achieve good accuracy for the parameters.

18. The wireless power charging system of claim 12 wherein the controller excites the transmitter coil at different input voltages/currents.

19. The wireless power charging system of claim 12 wherein the wireless power charging system further includes at least one relay coil between the transmitter coil and the receiver coil, said relay coil receiving electromagnetic field from the transmitter coil and sending it to the receiver coil.

20. The wireless power charging system of claim 19 further including a power inverter to drive the transmitter, and wherein current stress is shifted from the transmitter to the relay coil and a large relay current is generated to maximize the magnetic coupling with the receiver coil for efficient power transfer.

21. The wireless power charging system of claim 12 further including a switching mode converter in the receiver that is operated to emulate an optimal load, and a tracking circuit at the transmitter that causes the system to follow the maximum energy efficiency operating points of the system by searching for the minimum input power operating point for a given output power.

* * * * *